United States Patent Office 3,509,155
Patented Apr. 28, 1970

3,509,155
23,24-SECOALKALOIDS
Richard W. Rees, Newton Square, and Herchel Smith, Wayne, Pa., assignors to American Home Products Corporation, New York, N.Y., a corporation of Delaware
No Drawing. Filed Oct. 31, 1966, Ser. No. 590,512
Int. Cl. C07d 43/34
U.S. Cl. 260—287                                    7 Claims

ABSTRACT OF THE DISCLOSURE

Brucine, vomicine and alkaloids related thereto are subjected to reduction conditions yielding correspondingly reduced 23,24-secoalkaloids which are useful as tranquilizers and anti-depressants.

---

This invention relates to and has for its objects the provision of new physiologically active compounds, novel processes for their production and new intermediates useful in the preparation thereof.

More particularly, this invention relates to alkaloid compounds selected from the group consisting of those having the formulas

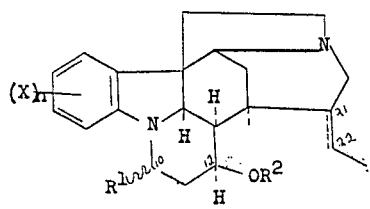

(I)

and

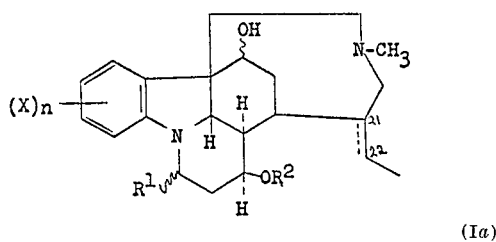

(Ia)

and the quaternary salts thereof, wherein the 21,22-position is saturated or double-bonded; ($) represents the cis or trans position to the C-12 hydrogen; X is hydroxy or methoxy; $R^1$ is hydrogen or hydroxy; $R^2$ is hydrogen or acyl; and $n$ is an integer from 1 to 2, with the proviso that $R^2$ is acyl only when $R^1$ is hydrogen.

Among the suitable acyls may be mentioned the acyl radicals of a hydrocarbon carboxylic acid of less than 12 carbon atoms, as exemplified by the lower alkanoic acids (e.g., acetic, propionic, butyric, hexanoic, decanoic and enanthic acid), the lower alkenoic acids (e.g., acrylic acid), the cycloalkane carboxylic acids (e.g., cyclobutane carboxylic acid), the monocyclic aromatic carboxylic acids (e.g., benzoic), and the monocyclic aryl lower alkanoic acids (e.g., phenacetic and β-phenyl propionic acid).

The final products of this invention are physiologically active substances which surprisingly possess both antidepressant and tranquillizing activity at doses showing no convulsant activity. Hence, the compounds of this invention may be used in lieu of chlordiazepoxide or imipramine.

The compounds of the present invention can be prepared and administered to warm-blooded animals, in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents: it can also be an encapsulating material. In powders the carrier is a finely divided solid which is in admixture with the finely divided compound. In the tablets the compound is mixed with carrier having the necessary binding properties in suitable proporations and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl-cellulose, sodium carboxymethylcellulose and other well known suspending agents.

Preferably, the pharmaceutical preparation is in unit dosage form. In such form the preparation is sub-divided in unit doses containing appropriate quantities of the compound: the unit dosage form can be a packaged preparation, the package containing discrete quantites of prepration, for example, packeted powders of vials or ampules.

The unit dosage form can be a capsule, cachet or tablet itself, or it can be the appropriate number of any of these in packaged form. The quantity of compound in a unit dose of preparation may be varied or adjusted from a 0.5 mg. to 100 mg. (generally within the range of 0.5 to 10 mg. for use as an anti-depressant agent and 10 to 50 mg. for use as a tranquillizer) according to the particular application and the potency of the active ingredient.

The claimed compositions having physiological activity can be incorporated into pharmaceutical formulations including sustained-release agents.

The compound of this invention can be prepared by reducing a compound of the Formula II:

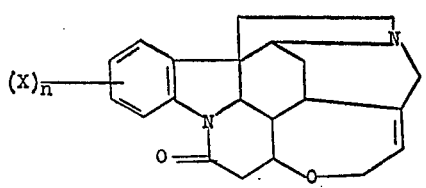

(II)

wherein X and $n$ are as hereinbefore defined, in liquid ammonia with a lower alkanol and a metal from Group I or Group II of the Periodic Table, preferably sodium, to yield compounds of the formulae

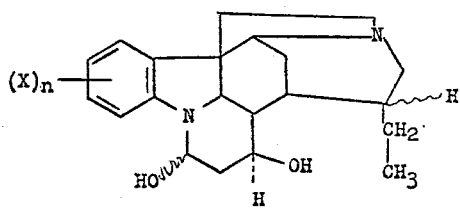

(III)

and

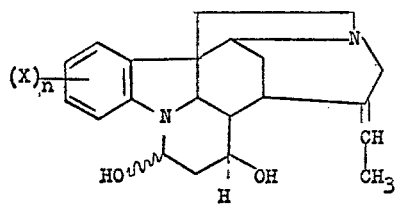

(IV)

wherein X and n are as hereinbefore defined.

Higher yields of compounds of Formula III are obtained by prolonged reduction of the initial compound.

Alternatively, the final products can be prepared by similarly reducing a compound of the Formula V:

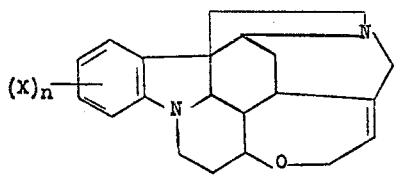

(V)

wherein X and n are as hereinbefore defined, to yield compounds of the formulae:

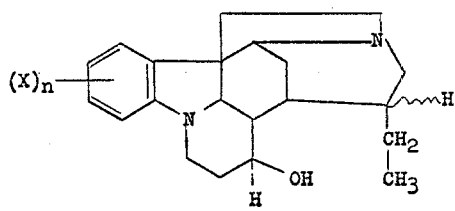

(VI)

and

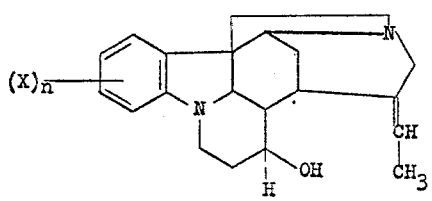

(VII)

wherein X and n are as hereinbefore defined.

A still further process for preparing the final products is to reduce in ammonia with a lower alkanol and a metal from Group I or II of the Periodic Table, a compound of the Formula VIII:

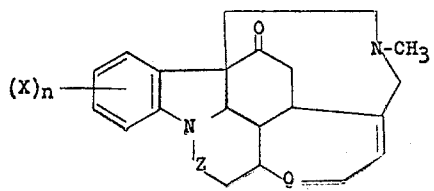

(VIII)

wherein X and n as hereinbefore defined, and Z is methylene

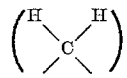

or keto $>C=O$), to yield the compound of the Formula IX:

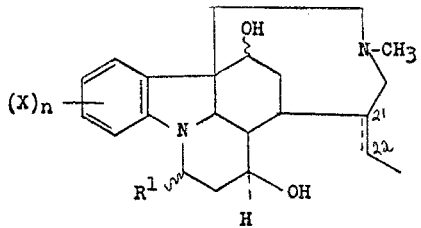

(IX)

wherein $R^1$, X and n are as hereinbefore defined.

The esters of this invention can be prepared by acylating the corresponding hydroxy compounds in the usual manner. Thus, to prepare the 12-acyloxy derivatives wherein the acyl radical corresponds to the acyl radical of a hydrocarbon carboxylic acid of less than 12 carbon atoms, either the acyl halide or acid anhydride of a lower alkanoic acid, lower alkenoic acid, monocyclic aryl carboxylic acid, monocyclic aryl lower alkenoic acid, cycloalkane carboxylic acid or cycloalkene carboxylic acid is employed as a reactant.

The tertiary nitrogen atoms of the final products of this invention may be quaternized by any conventional method, such as by treatment with an alkyl halide in an organic solvent.

Among the suitable starting materials that are utilizable in the process of this invention which are commercially available or can be made by any conventional method, may be mentioned brucine, brucidine, α-colubrine, β-colubrine, α-colubridine, β-colubridine, vomicidine, vomicine and the like.

The following examples illustrate the invention (all temperatures being in centigrade):

EXAMPLE 1

10-hydroxy-23,24-secobrucidine 5 gm. of sodium is added piecemeal over a 1 hour period to a vigorously stirred dispersion of 5 gm. of brucine in 500 ml. of liquid ammonia containing 5 ml. of ethanol. 10 gm. ammonium chloride is then added and the ammonia allowed to evaporate. Water is added to the residue and the precipitate is filtered off and washed with 10% aqueous sodium hydroxide. The precipitate is dissolved in benzene, percolated through a short column of alumina. The eluate is evaporated to dryness in vacuo and the residue is recrystallized from acetone-ether to give 1.5 gm. of 10-hydroxy-23,24-secobrucidine as a solvate having a melting point of 163–170°. Distillation of an aliquot at 220°/2 mm. yields the 10-hydroxy-23,24-secobrucidine as a glass, containing about 25% of the 10-hydroxy-21,22-dihydro-23,24-secobrucidine.

Analysis.—Calcd. for $C_{23}H_{30}N_2O_4$ (percent): C, 69.3; H, 7.6. Found (percent): C, 70.0; H, 7.6.

EXAMPLE 2

23,24-secobrucidine 3 gm. of sodium is added piecemeal over a 30 minute period to a vigorously stirred dispersion of 2 gm. of brucidine in 300 ml. of liquid ammonia containing 2 ml. of of methanol. After a further 10 minutes, 2 gm. of ammonium chloride is added followed by 300 ml. of water. The mixture is extracted with ether and an aliquot is distilled at 190–210°/2 mm. to yield 23,24-secobrucidine as a glass.

*Analysis.*—Calcd. for $C_{23}H_{30}N_2O_3$ (percent): C, 72.2; H, 7.9; N, 7.3. Found (percent): C, 72.1; H, 8.3; N, 7.0.

EXAMPLE 3

23,24-secobrucidine acetate 0.4 gm. of 23,24-secobrucidine is placed in 3 ml. of pyridine and 2.5 ml. of acetic anhydride overnight at room temperature. The solvent is evaporated and the product is distilled at 200°/2 mm. to yield 23,24-secobrucidine acetate as a glass.

*Analysis.*—Calcd. for $C_{25}H_{32}N_2O_4$ (percent): C, 70.7; H, 7.6. Found (percent): C, 69.7; H, 7.6.

In a similar manner by substituting any other acid anhydride or acyl chloride for the acetic anhydride of Example 3, the corresponding ester is formed.

EXAMPLE 4

21,22-dihydro-23,24-secobrucidine 3.5 gm. of sodium is added piecemeal over a 30 minute period to a vigorously stirred dispersion of 4 gm. of brucidine in 400 ml. of liquid ammonia containing 4 ml. of methanol. After a further 45 minutes, 4.0 gm. of ammonium chloride is added and the mixture is worked up as in Example 2 to give 2 gm. of 21,22-dihydro-23,24-secobrucidine as an acetone solvate having a melting point of 192–196°. The analytical sample, prepared by recrystallization from acetone and drying in vacuo has a melting point of 195–202°.

*Analysis.*—Calcd. for $C_{23}H_{32}N_2O_3$ (percent): C, 71.8; H, 8.4. Found (percent): C, 71.6; H, 8.4.

EXAMPLE 5

10ξ-hydroxy-23,24-secocolubridine and 21ξ,22-dihydro-10ξ-hydroxy-23,24-secocolubrine Following the procedure of Example 4, but substituting colubrine for brucine there is obtained a mixture of 10ξ-hydroxy-23,24-secocolubridine and 21,22-dihydro-10-hydroxy-23,24-secocolubrine which may be separated by chromatography on silica gel and eluting with the appropriate solvents.

EXAMPLE 6

23,24-secocolubridine and 21,22-dihydro-23,24-secocolubridine

Following the procedure of Example 4 but substituting colubrine for brucidine there is obtained a mixture of 23,24-secocolubridine and 21,22-dihydro-23,24-secocolubridine which may be separated by chromatography on silica gel and eluting with the appropriate solvents.

EXAMPLE 7

10,16-dihydroxy-23,24-secovomicidine and 10,16-dihydroxy-21,22-dihydro-23,24-secovomicidine Following the procedure of Example 4, but substituting vomicine for brucidine there is obtained a mixture of 10,16-dihydroxy-23,24 - secovomicidine and 10,16-dihydroxy-21,22-dihydro-23,24-secovomicidine which may be separated by chromatography on silica gel and eluting with the appropriate solvents.

EXAMPLE 8

16-hydroxy-23,24-secovomicidine and 16-hydroxy-21,22-dihydro-23,24-secovomicidine Following the procedure of Example 4, but substituting vomicidine for brucidine there is obtained a mixture of 16 - hydroxy - 23,24 - secovomicidine and 16 - hydroxy-21,22-dihydro-23,24-secovomicidine which may be separated by chromatography on silica gel and eluting with the appropriate solvents.

EXAMPLE 9

To prepare 1000 tablets, each containing 25 mg. of 21,22-dihydro-10-hydroxy-23,24-secobrucidine, the following ingredients are used:

| | Gm. |
|---|---|
| 21,22-dihydro-10-hydroxy-23,24-secobrucidine | 25.0 |
| Milk sugar | 164.12 |
| Ethylcellulose | 0.1 |
| Corn starch | 13.0 |
| Sodium Benzoate | 0.02 |
| Talc | 4.7 |
| Acacia powder | 2.5 |
| Magnesium stearate | 1.5 |

A tablet granulation is prepared from these ingredients by admixing the 21,22-dihydro - 10 - hydroxy-23,24-secobrucidine with a starch paste comprising the corn starch, milk sugar, sodium benzoate, ethyl cellulose and acacia powder in a sufficient amount of water to provide a pasty consistency. The mixture is worked until it granulates and then passed through a large mesh screen (e.g., No. 16). The granules are dried and then put through a No. 20 screen and mixed with the previously sieved talc and magnesium stearate. The resulting granulation is then pressed into tablets, each containing the specified amount of active ingredient.

Similarly, all the other compounds within the purview of this invention may be tableted.

TABLE I.—NUCLEAR MAGNETIC RESONANCE DATA [1]

| Compound | $C_1$—$C_4$ | $C_{22}$ | $C_{22}$ | $C_{10}$ | Methoxyls | $C_{23}$ [2] | $C_{23}$ [3] | Acetate methyl |
|---|---|---|---|---|---|---|---|---|
| Brucine | 7.78 (s) (1); 6.78 (s) (1) | 5.84 (t) (1) | | | 3.85 (s); 3.82 (s) | | | |
| Brucidine | 6.58 (s) (1); 6.03 (s) (1) | 5.70 (t) (1) | | | 3.79 (s); 3.76 (s) | | | |
| 10-hydroxy-23,24-secobrucidine. (Example 1) [4,5] | 6.78 (s) (1); 5.71 (s) (1) | 5.52 (q) (0.75) | | 4.92 (m) (1) | 3.77 (s); 3.23 (s) | 1.69(d) | 0.91 (t) (0.7) | |
| 21,22-Dihydro-23,24-secobrucidine (Example 4). | 6.57 (s) (1); 6.09 (s) (1) | | | | 3.81 (s); 3.75 (s) | | 0.91 (t) (3) | |
| 23,24-Secobrucidine (Example 2). | 6.60 (s) (1); 6.08 (s) (1) | 5.42 (q) (1) | | | 3.78 (s); 3.73 (s) | 1.69 (d) (3) | | |
| 23,24-Secobrucidine acetate (Example 3). | 6.61 (s) (1); 6.09 (s) (1) | 5.32 (q) (1) | 5.12 (m) (1) | | 3.82 (s); 3.76 (s) | 1.47 (d) (3) | | 1.93 (s) (3) |

[1] Determined for deuteriochloroform solutions on a Varian A-60 Spectrometer, with tetramethylsilane as internal standard. Data are presented as units, s-singlets, d-doublet, t-triplet, q-quartet, m-multiplet. Centers of gravity were estimated visually for all signals except the aromatic multiplets. Figures in parenthesis give estimates of the proton contents of the corresponding signals estimated by assuming the right aromatic proton content.
[2] When $\Delta^{21}$ is present.
[3] When $\Delta^{21}$ is saturated.
[4] Estimated to contain about 25 percent of 10-hydroxy-21,22-dihydro-23,24-secobrucidine.
[5] Determined on a benzene solvate.

Similarly, by substituting another metal from Group I or II of the Periodic Table for sodium in Examples 1 through 8, the initial compounds may be similarly reduced.

The invention may be variously otherwise embodied within the scope of the appended claims.

What is claimed is:

1. A compound selected from the group consisting of those having the formula:

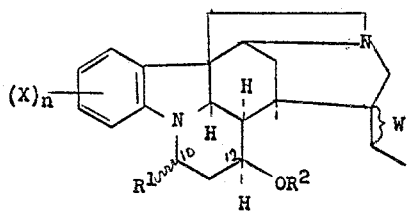

wherein W is selected from the group consisting of a double-bond and a saturated linkage between C–21 and C–22; X is methoxy; $R^1$ is selected from the group consisting of hydrogen and hydroxy; and $R^2$ is selected from the group consisting of hydrogen and acetyl, and $n$ is an integer from 1 to 2, with the proviso that $R^2$ is acetyl only when $R^1$ is hydrogen.

2. A compound according to claim 1 having the formula:

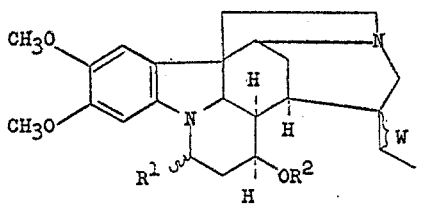

wherein W is selected from the group consisting of a double-bond and a saturated linkage between C–21 and C–22; $R^1$ is selected from the group consisting of hydrogen and hydroxy; and $R^2$ is selected from the group consisting of hydrogen and acetyl with the proviso that $R^2$ is acetyl only when $R^1$ is hydrogen.

3. A compound according to claim 1 that is 10-hydroxy-23,24-secobrucidine.

4. A compound according to claim 1 that is 23,24-secobrucidine.

5. A compound according to claim 1 that is 23,24-secobrucidine acetate.

6. A compound according to claim 1 that is 21,22-dihydro-23,24-secobrucidine.

7. A compound according to claim 1 that is 10-hydroxy-21,22-dihydro-23,24-secobrucidine.

References Cited

UNITED STATES PATENTS

| | | | |
|---|---|---|---|
| 2,224,368 | 12/1940 | Musselman | 260—236 X |
| 2,390,281 | 12/1945 | Tischler | 260—236 |
| 2,258,113 | 8/1956 | Zellner | 260—236 |
| 2,858,314 | 10/1958 | Georgian | 260—287 |

OTHER REFERENCES

Merck Index, 7th edition, pp. 172–3, 986–7 relied on (1960).

Manske: "The Alkaloids," vol. I, Academic Press, p. 411 relied on (1950).

Manske: "The Alkaloids," vol. II (supplement to vols. I and II), Academic Press, p. 188 relied on (1960).

D. A. DAUS, Primary Examiner

U.S. Cl. X.R.

260—280, 286; 424—262